United States Patent
Mcleod

(10) Patent No.: US 10,835,843 B2
(45) Date of Patent: Nov. 17, 2020

(54) MULTILAYER FILTRATION DEVICE

(71) Applicant: Clarification Technology, Inc., Kirkland, WA (US)

(72) Inventor: Neil Alexander Mcleod, Shawell (GB)

(73) Assignee: Clarification Technology, Inc., Kirkland, WA (US)

( * ) Notice: Subject to any disclaimer, the term of this patent is extended or adjusted under 35 U.S.C. 154(b) by 500 days.

(21) Appl. No.: 15/387,452

(22) Filed: Dec. 21, 2016

(65) Prior Publication Data

US 2017/0172346 A1 Jun. 22, 2017

Related U.S. Application Data

(60) Provisional application No. 62/271,192, filed on Dec. 22, 2015.

(51) Int. Cl.
| | |
|---|---|
| *B01D 29/07* | (2006.01) |
| *C11C 1/08* | (2006.01) |
| *C11B 13/00* | (2006.01) |
| *C11C 1/02* | (2006.01) |
| *B01D 29/41* | (2006.01) |

(52) U.S. Cl.
CPC ............ *B01D 29/07* (2013.01); *B01D 29/41* (2013.01); *C11B 13/00* (2013.01); *C11C 1/025* (2013.01); *C11C 1/08* (2013.01); *Y02W 30/74* (2015.05)

(58) Field of Classification Search
CPC ......... B01D 29/07; B01D 29/41; C11B 13/00; C11C 1/025; C11C 1/08; Y02W 30/74
USPC ................... 99/408, 118; 426/271, 417, 423; 554/196, 191, 192, 195
See application file for complete search history.

(56) References Cited

U.S. PATENT DOCUMENTS

| | | |
|---|---|---|
| 3,147,291 A | 9/1964 | Bergman |
| 3,666,107 A | 5/1972 | Boggs et al. |
| 4,221,663 A * | 9/1980 | Little ............... B01D 25/26 210/193 |
| 4,282,094 A | 8/1981 | Mitchell |

(Continued)

OTHER PUBLICATIONS

Carlson Filtration LTD, "Lenticular Filtration Carlent," product brochure, retrieved from http://www.carlson.co.uk/wp-content/uploads/2017/01/Carllent-brochure.pdf, 2017, 6 pages.

(Continued)

*Primary Examiner* — Tu B Hoang
*Assistant Examiner* — Vy T Nguyen
(74) *Attorney, Agent, or Firm* — Seed IP Law Group LLP

(57) ABSTRACT

A filtration device for filtering cooking oil is provided. The filtration device may include a hub and one or more filtration units having a central aperture to coupleably receive the hub. Each of the one or more filtration units may include a first upper filter sheet including a water insoluble or partially water insoluble material or combination of materials that convert or at least partially convert free fatty acid in the cooking oil to soap and a second upper filter sheet arranged adjacent to the first upper filter sheet and coupled thereto. The second upper filter sheet can include a material or combination of materials that remove or at least partially remove the soap from the cooking oil to produce filtered cooking oil. The one or more filtration units can be in fluid communication with the hub through which filtered cooking oil may be removed from the filtration device.

29 Claims, 3 Drawing Sheets

(56) References Cited

U.S. PATENT DOCUMENTS

| | | | | |
|---|---|---|---|---|
| 4,876,007 | A * | 10/1989 | Naruo | B01D 25/26 210/339 |
| 5,077,070 | A * | 12/1991 | Regutti | C11B 3/10 210/503 |
| 5,252,762 | A * | 10/1993 | Denton | C11B 3/10 502/408 |
| 5,271,838 | A * | 12/1993 | Rahimi | B01D 25/26 210/346 |
| 6,712,966 | B1 | 3/2004 | Pulek et al. | |
| 2010/0320139 | A1 * | 12/2010 | Diemer | B01D 25/26 210/346 |
| 2014/0360930 | A1 | 12/2014 | Tinkham et al. | |
| 2014/0360931 | A1 | 12/2014 | Tinkham et al. | |
| 2015/0258468 | A1 | 9/2015 | Siwak | |
| 2015/0298032 | A1 | 10/2015 | Tinkham et al. | |
| 2016/0175744 | A1 | 6/2016 | Lucas et al. | |

OTHER PUBLICATIONS

Pall Food and Beverage, "Pall SUPRAdisc™ II Depth Filter Modules," product brochure, Pall corporation, 2014, 12 pages.

* cited by examiner

MULTILAYER FILTRATION DEVICE

BACKGROUND

Technical Field

This disclosure generally relates to filter devices and, more particularly, to filter devices employed in removing contaminants from used hot cooking oil, such as cooking oil used in commercial or industrial deep fryers.

Description of the Related Art

Cooking oils, such as those used in commercial or industrial deep fryers, tend to become contaminated with moisture, carbonized food particles, and the like during the frying process. Additionally, the oils themselves tend to break down chemically after extended use, which introduces additional contaminants into the cooking oil. Some of these contaminants have the undesirable characteristics of causing the oil to foam, smoke, smell bad, possess an unsightly appearance, and/or impart a bad taste to the fried food. Cleaning the cooking oil by removing the contaminants and filtering it on a regular basis helps to extend the useful life of the cooking oil and increase the quality and appearance of foods which are cooked therein.

Cooking oils used in commercial industrial deep fryers tend to decompose at the high temperatures (e.g., 300° F. or higher) used for frying. Oil decomposition may be caused by chemical breakdown of the oil compounds due to reaction with water or moisture contained in the foods undergoing frying. Such a process, i.e., oil hydrolysis, can increase the concentration of free fatty acids (FFA) in the cooking oil. These FFA are volatile substances and therefore the smoke, flash, and fire points of the cooking oils decrease as the concentration of FFA increases. Consequently, reducing the concentration of FFA in the cooking oils is highly desirable.

BRIEF SUMMARY

In various implementations, filtration devices and related systems with robust and efficient form factors enable reduction of a concentration of FFA in cooking oils. An exemplary implementation of a filtration device for removing contaminants from cooking oil can be summarized as including a hub and one or more filtration units having a central aperture to coupleably receive the hub. The one or more filtration units can include a first upper filter sheet including a water insoluble or partially water insoluble material or combination of materials that convert or partially convert free fatty acid in the cooking oil to a soap and a second upper filter sheet adjacent to the first upper filter sheet and coupled thereto. The second upper filter sheet can include a material or combination of materials that remove or at least partially remove the soap from the cooking oil to produce filtered cooking oil, where the one or more filtration units are in fluid communication with the hub.

Another exemplary implementation of a filtration device for removing contaminants from cooking oil can be summarized as including a hub, a first media including a first upper filter sheet and a first lower filter sheet, and a second media including a second upper filter sheet and a second lower filter sheet. The first upper filter sheet and the first lower filter sheet of the first media can include a water insoluble or partially water insoluble material or combination of materials that converts or partially converts free fatty acid in the cooking oil to a soap. The second upper filter sheet and the second lower filter sheet of the second media can include a material or combination of materials that removes or at least partially removes the soap from the cooking oil to produce a filtered cooking oil, where the second upper filter sheet is spaced apart from the second lower filter sheet to define a fluid conduit in fluid communication with the hub.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and they have been solely selected for ease of recognition in the drawings.

DETAILED DESCRIPTION

It will be appreciated that, although specific implementations of the present disclosure are described herein for purposes of illustration, various modifications may be made without departing from the spirit and scope of the present disclosure. Accordingly, the present disclosure is not limited except as by the appended claims.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with filtration devices generally, or more specifically, lenticular filtration devices, have not been shown or described in detail to avoid unnecessarily obscuring descriptions of the implementations.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same aspect. Furthermore, the particular features, structures, or characteristics may be combined in any suitable manner in one or more aspects of the present disclosure.

The use of ordinals such as first, second and third does not necessarily imply a ranked sense of order, but rather may only distinguish between multiple instances of an act or structure.

In the figures, identical reference numbers identify similar features or elements. The sizes and relative positions of the features in the figures are not necessarily drawn to scale.

Figure 1:
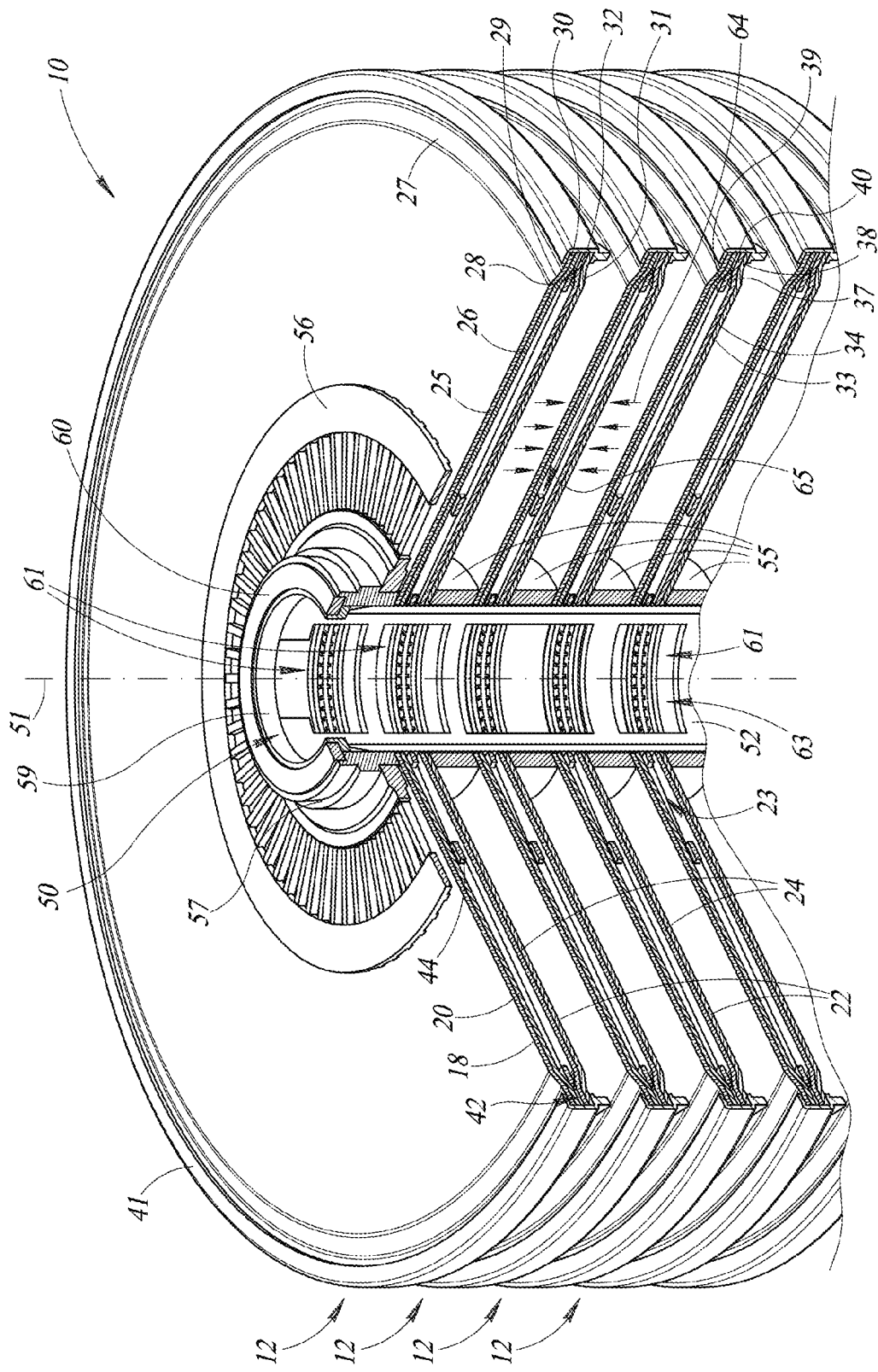
FIG. 1 is a partial cutaway perspective view of a filtration device, according to one implementation.
Figure 2:
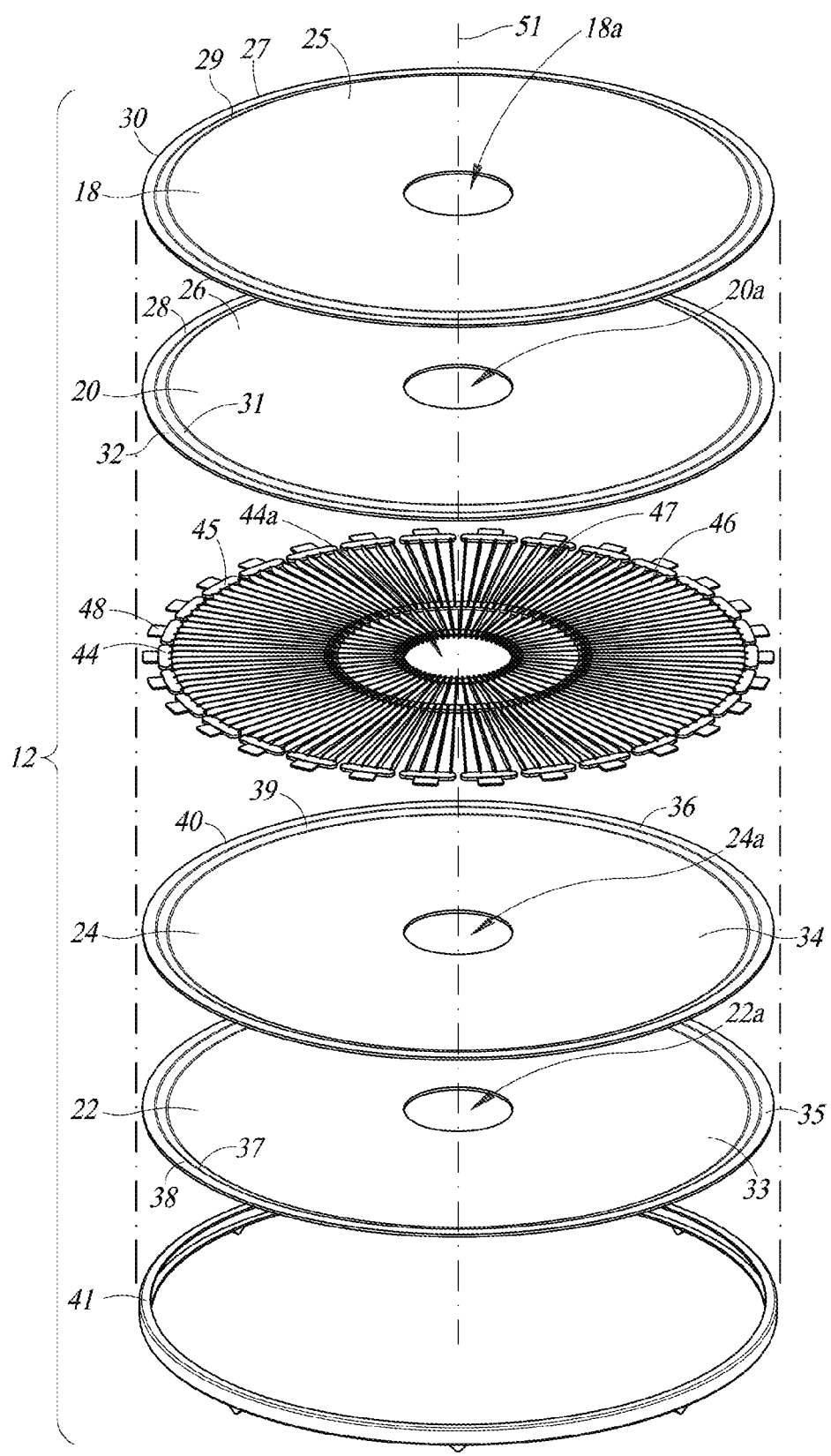
FIG. 2 is an exploded view of a filtration unit of the filtration device of FIG. 1, according to one implementation.

FIG. 1 illustrates a filtration device 10 according to one non-limiting implementation, with certain components removed for clarity of illustration and description, e.g., an outer vessel that contains various components of the filtration device 10, entry and exit ports, etc. The filtration device 10 includes one or more filtration units 12. FIG. 2 illustrates an exploded view of an individual filtration unit 12. As shown in FIGS. 1-2, each filtration unit 12 includes a first upper filter sheet 18, a second upper filter sheet 20, a first lower filter sheet 22, and a second lower filter sheet 24. The first upper filter sheet 18 and the second upper filter sheet 20 have a generally circular shape and include respective upper surfaces and lower surfaces. The first upper filter sheet 18 is coupled to the second upper filter sheet 20 with the lower surface of the first upper filter sheet 18 mating with the upper surface of the second upper filter sheet 20. In some implementations, the first upper filter sheet 18 can be fixedly coupled to the second upper filter sheet 20 via bonding with adhesives, welding (e.g., heat or ultrasonic weld), or similar techniques and methods. In some implementations, the first upper filter sheet 18 may mate with the second upper filter sheet 20 without forming a permanent bond therebetween.

In some implementations, the filtration unit 12 may optionally further include one or more scrim layers (not shown). For example, in some implementations, the scrim layer can be coupled to the upper surface of the first upper filter sheet 18 and/or the lower surface of the first lower filter sheet 22. The scrim layer may be a woven or nonwoven layer made from fibers to strengthen the filtration unit 12. The scrim layer may be made from materials such as nylon, polyester, fiberglass, and the like. The scrim layer may be coupled to the first upper filter sheet 18 and/or the first lower filter sheet 22 via bonding with adhesives, welding (e.g., heat or ultrasonic weld), or similar techniques and methods.

The first upper filter sheet 18 and the second upper filter sheet 20 include respective main portions 25, 26 and edge portions 27, 28. The edge portion 27 of the first upper filter sheet 18 includes a taper section 29 that tapers downwardly relative to the main portion 25 and a straight portion 30 that extends in a direction that is substantially parallel to the main portion 25 of the first upper filter sheet 18. The edge portion 28 of the second upper filter sheet 20 also includes a taper section 31 that tapers downwardly relative to the main portion 26 and a straight portion 32 that extends in a direction that is substantially parallel to the main portion 26 of the second upper filter sheet 20.

The first lower filter sheet 22 and the second lower filter sheet 24 also have a generally circular shape and include respective upper surfaces and lower surfaces. The first lower filter sheet 22 is coupled to the second lower filter sheet 24 with the upper surface of the first lower filter sheet 22 mating with the lower surface of the second lower filter sheet 24. In some implementations, the first lower filter sheet 22 can be fixedly coupled to the second lower filter sheet 24 via bonding with adhesives, welding (e.g., heat or ultrasonic weld), or similar techniques and methods. In some implementations, the first lower filter sheet 22 may mate with the second lower filter sheet 24 without forming a permanent bond therebetween.

The first lower filter sheet 22 and the second lower filter sheet 24 include respective main portions 33, 34 and edge portions 35, 36. The edge portion 35 of the first lower filter sheet 22 includes a taper section 37 that tapers upwardly relative to the main portion 33 and a straight portion 38 that extends in a direction that is substantially parallel to the main portion 33 of the first lower filter sheet 22. The edge portion 36 of the second lower filter sheet 24 also includes a taper section 39 that tapers upwardly relative to the main portion 34 and a straight portion 40 that extends in a direction that is substantially parallel to the main portion 34 of the second lower filter sheet 24.

Each filtration unit 12 includes an edge seal 41 which secures the coupled first upper filter sheet 18 and second upper filter sheet 20 to the coupled first lower filter sheet 22 and second lower filter sheet 24. In particular, the edge seal 41 includes a substantially C-shaped cross-section which defines a receiving region 42. The receiving region 42 receives the respective straight portions 30, 32 of the coupled first upper filter sheet 18 and second upper filter sheet 20 and the respective straight portions 38, 40 of the coupled first lower filter sheet 22 and second lower filter sheet 24 which allows the edge seal 41 to secure such together to form a sealing engagement of the coupled first upper filter sheet 18 and second upper filter sheet 20 and the coupled first lower filter sheet 22 and second lower filter sheet 24. In addition to coupling first upper filter sheet 18 and second upper filter sheet 20 to first lower filter sheet 22 and second lower filter sheet 24, edge seal 41 may secure or couple first upper filter sheet 18 and second upper filter sheet 20 to each other. Similarly, edge seal 41 may secure or couple first lower filter sheet 22 and second lower filter sheet 24 to each other.

As shown in FIG. 2, when the edge seal 41 secures the coupled first upper filter sheet 18 and second upper filter sheet 20 and the coupled first lower filter sheet 22 and second lower filter sheet 24, the filter unit 12 forms a lenticular shape, where the first and second upper filter sheets 18, 20 and the first and second lower filter sheets 22, 24 define a fluid conduit 23 between the lower surface of the second upper filter sheet 20 and the upper surface of the second lower filter sheet 24. In some implementations, the filtration unit 12 may optionally include a drainage spacer 44 disposed in the fluid conduit 23 between the second upper filter sheet 20 and the second lower filter sheet 24. The drainage spacer 44 generally provides stability and stiffness to the filtration unit 12.

The drainage spacer 44 includes a plurality of tab portions 45 that are disposed circumferentially around the drainage spacer 44. The drainage spacer 44 also includes a plurality of spokes 46 that are angularly spaced apart. In particular, a number of spokes 46, e.g., three spokes 46, extend from the tab portion 45 toward a center of the drainage spacer 44. Each of the spokes 46 are angularly equally spaced apart to define drainage passageways 47 between adjacent spokes 46.

As discussed above, the drainage spacer 44 is disposed in the fluid conduit 23 between the second upper filter sheet 20 and the second lower filter sheet 24. The drainage spacer 44 is secured to the coupled first upper filter sheet 18 and second upper filter sheet 20 and the coupled first lower filter sheet 22 and second lower filter sheet 24 via the edge seal 41. In particular, each tab portion 45 includes a lip portion 48 which is sandwiched between the respective straight portions 30, 32 of the coupled first upper filter sheet 18 and second upper filter sheet 20 and the respective straight portions 38, 40 of the coupled first lower filter sheet 22 and second lower filter sheet 24. In this manner, the edge seal 41 secures the coupled first upper filter sheet 18 and second upper filter sheet 20, the coupled first lower filter sheet 22 and second lower filter sheet 24, and the drainage spacer 44 together.

As shown in FIG. 2, the first upper filter sheet 18 includes a first upper aperture 18a which extends through the main portion 25 of the first upper filter sheet 18 and is substantially concentric with a center of the first upper filter sheet 18. The second upper filter sheet 20 includes a second upper aperture 20a which extends through the main portion 26 of the second upper filter sheet 20 and is substantially concentric with a center of the second upper filter sheet 20. The first lower filter sheet 22 includes a first lower aperture 22a which extends through the main portion 33 of the first lower filter sheet 22 and is substantially concentric with a center of the first lower filter sheet 22. The second lower filter sheet 24 includes a second lower aperture 24a which extends through the main portion 34 of the second lower filter sheet 24 and is substantially concentric with a center of the second lower filter sheet 24. The drainage spacer 44 also includes a drainage spacer aperture 44a which extends through a body of the drainage spacer 44 and is substantially concentric with a center of the drainage spacer 44.

When the coupled first upper filter sheet 18 and second upper filter sheet 20, the coupled first lower filter sheet 22 and second lower filter sheet 24, and the drainage spacer 44 are secured together via the edge seal 41, the first upper aperture 18a, the second upper aperture 20a, the first lower aperture 22a, the second lower aperture 24a, and the drainage spacer aperture 44a are substantially concentric with each other to define a central aperture 50 and a central axis 51 of the filtration unit 12.

With continued reference to FIGS. 1-2, the filtration device 10 includes an annular hub or column 52. The annular hub or column 52 is sized and shaped to secure the one or more filtration units 12 in an axially spaced or stacked relationship. In particular, the central aperture 50 of the one or more filtration units 12 is sized and shaped to be received around the annular hub or column 52, and around which the one or more filtration units 12 are mounted. The filtration device 10 includes a plurality of annular spacer rings 55 which are received around the annular hub or column 52 and disposed between adjacent ones of the one or more filtration units 12. The spacer rings 55 are sized and shaped to maintain axial spacing between adjacent ones of the one or more filtration units 12. Proximal to an upper end of the annular hub or column 52, the filtration device 10 includes a horizontal support structure 56 and an end cap 57. Similarly, proximal to a lower end of the annular hub or column 52, the filtration device 10 also includes another horizontal support structure 56 (not shown) and another end cap 57 (not shown) which are also secured to the annular hub or column 52. The horizontal support structures 56 and the end caps 57 proximal to the upper and lower ends of the annular hub or column 52 are configured to apply compressive force to maintain the axially spaced or stacked relationship of the one or more filtration units 12 and secure the one or more filtration units 12 to the annular hub or column 52. Furthermore, as shown in FIG. 1, the filtration device 10 may also include proximal to the upper end of the annular hub or column 52 a seal holder 59 which is coupled to the end cap 57 and configured to receive a seal 60. Similarly, although not shown, proximal to the lower end of the annular hub or column 52, the filtration device 10 may also include another seal holder 59 which is coupled to the end cap 57 and configured to receive another seal 60.

As shown in FIG. 1, the annular hub or column 52 includes a plurality of openings 61. The plurality of openings 61 can be disposed in the annular hub or column 52 and spaced apart in an axial direction and in a radial direction. More particularly, the plurality of openings 61 are sized and configured to be located adjacent to the one or more filtration units 12 to provide a fluidly communicative path from the fluid conduit 23 to a central passageway 63 of the annular hub or column 52, as discussed in more detail below.

In some implementations, the first upper filter sheet 18 and/or the first lower filter sheet 22 may be treated with or formed from a material or materials that include chemicals capable of converting free fatty acids (FFA) in the cooking oil to soap. In some implementations and without intending to be bound to any theory as to how the FFA in the cooking oil are converted to soaps, these treatment chemicals convert the FFA in cooking oil to soap according to the following chemical reaction:

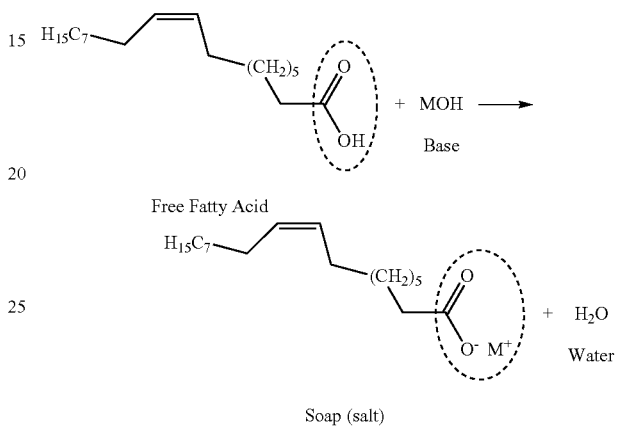

In some implementations, the chemicals capable of converting free fatty acids in the cooking oil to soap include a water insoluble or partially water insoluble base. Non-limiting examples of such water insoluble or partially water insoluble bases may include $MgCO_3$, $Mg(OH)_2$, $MgO$, $Ca(OH)_2$, $CaCO_3$, $CaO$, or one or more combinations thereof. In some implementations, the treatment chemicals may be in the form of powder that can be incorporated into the first upper filter sheet 18 and/or the first lower filter sheet 22. For example, the treatment chemicals in powder form can be added to a solution of oleic acid in rapeseed oil at appropriate amounts. Thereafter, the resulting solution can be used to treat the first upper filter sheet 18 and/or the first lower filter sheet 22. The first upper filter sheet 18 and/or the first lower filter sheet 22 may also include fibrous material, such as natural fibers such as cellulose fibers or synthetic fibers, and a wet strength resin. In general, in such implementations, the first upper filter sheet 18 and/or the first lower filter sheet 22 may include materials which can convert FFA in the cooking oil to soap and concurrently remove or at least partially remove the soap. For example, the first upper filter sheet 18 and/or the first lower filter sheet 22 may include a water insoluble or partially insoluble base, such as calcium hydroxide or any of the other non-limiting examples of water insoluble or partially insoluble bases discussed above. The first upper filter sheet 18 and/or the first lower filter sheet 22 may further include cellulose (e.g., cellulose fibers), silica gel (e.g., BRITESORB® amorphous silica gel powder adsorbents, from PQ Corporation, including silica hydrogels and silica xerogels), and activated carbon, wherein the calcium hydroxide, for example, can convert FFA in the cooking oil to soap and the silica gel (e.g., BRITESORB® amorphous silica gel powder adsorbents, from PQ Corporation, including silica hydrogels and silica xerogels) and activated carbon can remove the soap and/or other particulates in the cooking oil.

In some implementations, the second upper filter sheet 20 and/or the second lower filter sheet 24 may comprise fibrous material, such as cellulosic fiber, and activated carbon bound together by a wet strength resin to produce the second upper filter sheet 20 and/or the second lower filter sheet 24. Second upper filter sheet 20 and/or the second lower filter sheet 24 may also include other components such as alkaline earth metal silicates, such as calcium or magnesium silicates, and/or diatomaceous earth, silica gel (e.g., BRITESORB® amorphous silica gel powder adsorbents, from PQ Corporation, including silica hydrogels and silica xerogels), and/or other natural or artificial silica materials, with or without activated carbon. For example, the second upper filter sheet 20 and/or the second lower filter sheet 24 may be made from a material which is sold under the designation SuperSorb® by Clarification Technologies, Inc.

The first and second upper filter sheets 18, 20 and the first and second lower filter sheets 22, 24 cooperate to reduce the amount of FFA in cooking oils. For example, used cooking oil to be treated or filtered can be fluidly communicatively coupled to the filtration device 10. As the used cooking oil is received at the filtration device 10, the used cooking oil flows through the first upper filter sheet 18 and the first lower filter sheet 22 in a direction indicated by reference numeral 64, where FFA in the used cooking oil is converted into soap. The converted soap is thereafter filtered or removed from the filtered cooking oil by the second upper filter sheet 20 and the second lower filter sheet 24. In some implementations, in addition to converting FFA in the cooking oil to soap and removing soap from the cooking oil, the first and second upper filter sheets 18, 20 and the first and second lower filter sheets 22, 24 may also remove particulate contaminants and other impurities from the cooking oil. Removal of these other materials can be achieved by mechanical filtration or through chemical interaction between such contaminants and impurities and the complements of the first and second upper filter sheets 18, 20 and the first and second lower filter sheets 22, 24. In yet other implementations, the first and second upper filter sheets 18, 20 and/or the first and second lower filter sheets 22, 24 may convert undesirable material in the cooking oil to more desirable materials. For example, undesirable material in the cooking oil may be converted to materials that can be more effectively or easily removed from the cooking oil.

As the used cooking oil passes through the first and second upper filter sheets 18, 20 and the first and second lower filter sheets 22, 24, with FFA converted into soap and the soap thereafter removed, clean oil flows through the fluid conduit 23 and radially inward along the drainage spacer 44 toward the annular post or hub 52 in a direction indicated by reference numeral 65, with the soap and other particulates filtered and retained by the second upper filter sheet 20 and the second lower filter sheet 24. In particular, the passageways 47 between adjacent spokes 46 of the drainage spacer 44 direct the treated or clean cooking oil to corresponding ones of the plurality of openings 61 and thereafter through the central passageway 63 of the annular hub or column 52. In this manner, concentration of FFA contained in used cooking oil can be reduced by converting FFA to soap, removing or filtering the soap and particulates from the cooking oil, and producing cleaned or filtered cooking oil.

While the implementations of the filtration units 12 illustrated in FIGS. 1-2 include first upper filter sheet 18 and first lower filter sheet 22 to convert FFA into soap and second upper filter sheet 20 and second lower filter sheet 24 to filter or remove the soap and other particulates in the used cooking oil, in alternate implementations, the first and second upper filter sheets 18, 20 and the first and second lower filter sheets 22, 24 may include fibrous material and activated carbon bound together by a resin, such as, for example, filter sheets made from the material sold under the designation SuperSorb® by Clarification Technologies, Inc., cellulose, and/or silica gel (e.g., BRITESORB® amorphous silica gel powder adsorbents, from PQ Corporation, including silica hydrogels and silica xerogels). Such first and second upper filter sheets 18, 20 and first and second lower filter sheets 22, 24 may be treated with or manufactured to include the compositions that include the material or materials capable of converting FFA in the cooking oil to soap, such as the non-limiting examples discussed above. In this manner, the first and second upper filter sheets 18, 20 and the first and second lower filter sheets 22, 24 can convert FFA into soap and concurrently filter or remove the soap and other particulates to be filtered from the used cooking oil.

Further, while the various implementations of the filtration units 12 shown and described herein include double layer filtration units, i.e., filtration units including first upper filter sheet 18 and first lower filter sheet 22 (first media) and second upper filter sheet 20 and second lower filtration sheet 24 (second media), in some implementations, the filtration units 12 may include triple layer filtration units (third media), quadruple layer filtration units (fourth media), or any number of layers forming filtration units. Further, in some implementations, a first media of a filtration unit 12 (i.e., first upper filter sheet 18 and first lower filter sheet 22) may be treated with or manufactured to contain material to convert FFA into soap, and the remaining adjacent media, e.g., second media (i.e., second upper filter sheet 20 and second lower filter sheet 24), third media (i.e., third upper filter sheet and third lower filter sheet), and so forth may include fibrous material and activated carbon bound together by a resin, such as, for example, filter sheets made from the material sold under the designation SuperSorb® by Clarification Technologies, Inc., cellulose, and/or silica gel (e.g., BRITESORB® amorphous silica gel powder adsorbents, from PQ Corporation, including silica hydrogels and silica xerogels) to filter or remove the soap and particulates. Still further, in some implementations, each of the adjacent media of the filtration unit, e.g., first media, second media, third media, and so forth may include filter sheets which include fibrous material and activated carbon bound together by a resin, such as, for example, filter sheets made from the material sold under the designation SuperSorb® by Clarification Technologies, Inc., cellulose, and/or silica gel (e.g., BRITESORB® amorphous silica gel powder adsorbents, from PQ Corporation, including silica hydrogels and silica xerogels), and may be treated with or manufactured to include the materials capable of converting FFA in the cooking oil to soap discussed above. In this manner, the filtration unit may be multi-layered to convert FFA in used cooking oil to soap while concurrently removing the soap through each filter media.

Figure 3:
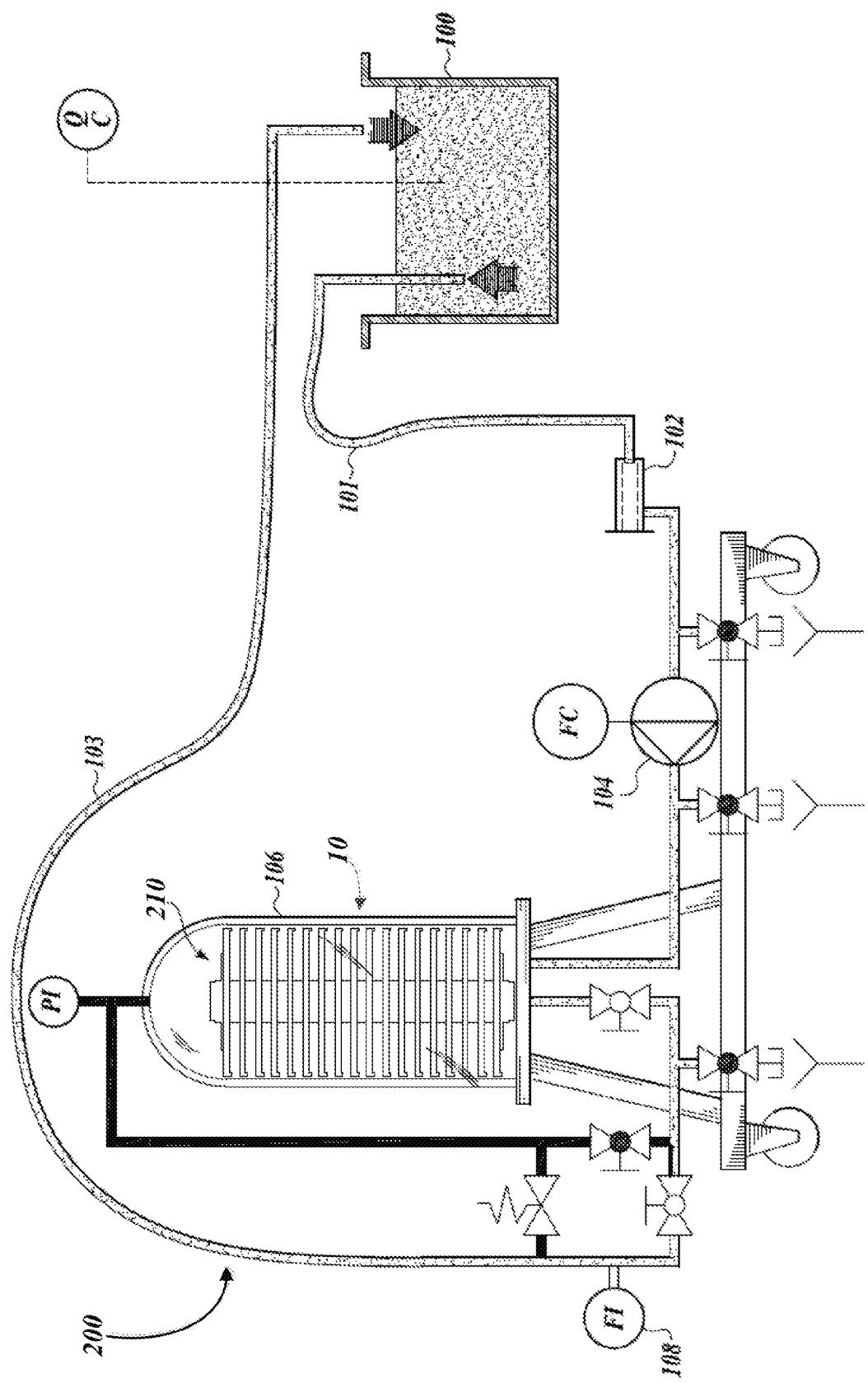
FIG. 3 is a schematic illustration of a system for filtering used cooking oil, according to one implementation.

FIG. 3 schematically illustrates a system 200 for filtering used cooking oil according to one non-limiting implementation. The system 200 includes a fryer 100 and a filtration device 10 according to the one or more implementations described herein and which can include the one or more implementations of filtration units 12 described herein. As shown in FIG. 3, the filtration device 10 includes a vessel 106 which houses the various components of the filtration device 10, e.g., one or more filtration units 12, annular hub or column 52, spacer rings 55, etc., and includes a chamber 210 for receiving used cooking oil. The fryer 100 is fluidly coupled to the filtration device 10 via one or more fluid conduits which form a line 101 that extends from the fryer 100 to a strainer 102, from the strainer 102 to a flow controller 104, and from the flow controller 104 to an inlet disposed on a lower portion of the vessel 106. The strainer 102 is configured to remove substantially large particles of materials contained in used cooking oil. The flow controller 104 meters the volume of used cooking oil being fed to the vessel 106.

The system 200 includes one or more fluid conduits which form a return line 103. The return line 103 also fluidly couples the filtration device 10 to the fryer 100. In particular, the return line 103 is in fluid communication with the central passageway 63 of the annular hub or column 52 and extends from a fluid outlet disposed in the lower portion of the vessel 106 to a flow meter 108 and from the flow meter 108 to the fryer 100. The system 200 also includes one or more fluid conduits which form a bypass line 109. The bypass line 109 extends from a bypass outlet disposed in a top portion of the vessel 106 and is routed to the return line 103. The bypass line 109 allows air to be vented from the vessel 106 and return any remaining used cooking oil in the line 103 from prior use to the fryer 100.

In operation, the used cooking oil flows to the filtration device 10 through the strainer 102 and flow controller 104 and into the vessel 106 and fills the chamber 210 of the vessel 106. The bypass outlet is blocked, which allows pressure to build in the vessel 106 and used cooking oil to flow through the one or more filtration units 12 as discussed in more detail above, including converting FFA to soap and thereafter filtering or removing the soap and other particulates from the used cooking oil. Cleaned and filtered oil flows from the fluid conduit 23 to the annular hub or column 52 and through the central passageway 63 of the annular hub or column 52 to the return line 103. The return line 103 transports the cleaned oil through the flow meter 108 to the fryer 100.

Moreover, the system 200 can include additional components which facilitate filtering or cleaning used cooking oil. For example, the system can include pumps which facilitate transportation of the used and cleaned cooking oil. The system can include instrumentation and associated piping or conduits with which the operation of the system can be monitored. For example, the fryer 100 may have a quality measuring instrument, the vessel 106 may have a pressure indicator, etc.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A filtration device for removing contaminants from cooking oil comprising:
    a hub; and
    one or more filtration units having a central aperture to coupleably receive the hub, each of the one or more filtration units including:
        a first upper filter sheet including a water insoluble or partially water insoluble material or combination of materials that convert or at least partially convert free fatty acid in the cooking oil to a soap, the first upper filter sheet including a first main portion and a first edge portion, the first edge portion including a first taper portion and a first straight portion, the first taper portion coupling the first straight portion of the first main portion;
        a second upper filter sheet adjacent to the first upper filter sheet and coupled thereto, the second upper filter sheet including a material or combination of materials that remove or at least partially remove the soap from the cooking oil to produce filtered cooking oil, the one or more filtration units in fluid communication with the hub, the second upper filter sheet including a second main portion and a second edge portion, the second edge portion including a second taper portion and a second straight portion, the second taper portion coupling the second straight portion to the second main portion, the second edge portion being aligned with the first edge portion, and the second main portion being aligned with the first main portion;
        a spacer adjacent to the second upper filter sheet and spaced from the first upper filter sheet by the second upper filter sheet, the spacer includes:
            a plurality of lip portions positioned at an edge of the spacer, each lip portion of the plurality of lip portions being separate and distinct from each other, each lip portion of the plurality of lip portions has a first width;
            a plurality of tab portions, each of the tab portions has a second width, each of the tab portions is coupled to a corresponding one of the plurality of lip portions, and the second width is greater than the first width; and
            a plurality of spokes extend outward from a central region of the spacer, at least two of the plurality of spokes are coupled to each tab portion of the plurality of tab portions, each of the tab portions couples the at least two of the plurality of spokes to each of the lip portions of the plurality of lip portions;
        an edge seal that covers and seals the first straight portion of the first upper filter sheet, the second straight portion of the second upper filter sheet, and the plurality of lip portions of the spacer that are sandwiched between the first straight portion of the first filter sheet and the second straight portion of the second filter sheet.

2. The filtration device of claim 1 wherein each of the one or more filtration units further comprises:
    a first lower filter sheet including a water insoluble or partially water insoluble material or combination of materials that convert or at least partially convert free fatty acid in the cooking oil to the soap, the first lower filter sheet including a third main portion and a third edge portion, the third edge portion including a third taper portion and a third straight portion, the third taper portion coupling the third straight portion to the third main portion; and
    a second lower filter sheet adjacent to the first lower filter sheet and coupled thereto, the second lower filter sheet including a material or combination of materials that remove or at least partially remove the soap from the cooking oil to produce filtered cooking oil, the second lower filter sheet including a fourth main portion and a fourth edge portion, the edge portion including a fourth taper portion and a fourth straight portion, the fourth taper portion coupling the fourth straight portion to the fourth main portion, the fourth straight portion being aligned with the third straight portion, and the fourth taper portion being aligned with the third taper portion; and a fluid conduit, the fluid conduit located between (1) the coupled first upper filter sheet and second upper filter sheet and (2) the coupled first lower filter sheet and second lower filter sheet.

3. The filtration device of claim 2 wherein the second lower filter sheet is spaced apart from the second upper filter sheet to define the fluid conduit, the fluid conduit in fluid communication with the hub.

4. The filtration device of claim 2, wherein the spacer is disposed in the fluid conduit between the second lower filter sheet and the second upper filter sheet.

5. The filtration device of claim 1 wherein the water insoluble or partially water insoluble material or combination of materials that convert free fatty acid in the cooking oil to the soap includes at least one of $MgCO_3$, $Mg(OH)_2$, MgO, $Ca(OH)_2$, $CaCO_3$, and CaO.

6. The filtration device of claim 1 wherein the material or combination of materials that remove or at least partially remove the soap from the cooking oil includes fibrous material.

7. The filtration device of claim 6 wherein the material or combination of materials that at least partially remove the soap from the cooking oil further includes at least one of alkaline earth metal silicates, natural silica materials, artificial silica materials, activated carbon, and combinations thereof.

8. The filtration device of claim 7 wherein the alkaline earth metal silicates include at least one of calcium silicates and magnesium silicates.

9. The filtration device of claim 1 wherein the first upper filter sheet further includes a material or combination of materials that removes or at least partially removes the soap from the cooking oil.

10. The filtration device of claim 1 wherein the second upper filter sheet further includes a water insoluble or partially water insoluble material or combination of materials that converts or partially converts free fatty acid in the cooking oil to the soap.

11. A filtration device for removing contaminants from cooking oil comprising:
 a hub;
 a first media including a first upper filter sheet and a first lower filter sheet, the first upper filter sheet and the first lower filter sheet including a water insoluble or partially water insoluble material or combination of materials that convert or partially convert free fatty acid in the cooking oil to a soap, the first upper filter sheet and the first lower filter sheet each including a main portion and an edge portion, the edge portions each including a taper portion and a straight portion, the taper portions couple the straight portions to the main portions, the taper portions and the straight portions of the first upper filter sheet and the first lower filter sheet are aligned with each other;
 a second media including a second upper filter sheet and a second lower filter sheet including a material or combination of materials that remove or at least partially remove the soap from the cooking oil to produce filtered cooking oil, the second upper filter sheet spaced apart from the second lower filter sheet to define a fluid conduit in fluid communication with the hub, the second upper filter sheet and the second lower filter sheet each including a main portion and an edge portion, the edge portions each including a taper portion and a straight portion, the taper portions couple the straight portions to the main portions, the taper portions and the straight portions of the second upper filter sheet and the second lower filter sheet are aligned with the taper portions and the straight portions of the first upper filter sheet and the first lower filter sheet;
 a spacer adjacent to the second upper filter sheet and the second lower filter sheet, the spacer separates the second upper filter sheet from the second lower filter sheet, the spacer includes:
  a plurality of lip portions positioned at an edge of the spacer being separate and distinct from each other, each lip portion of the plurality of lip portions has a first width;
  a plurality of tab portions, each of the tab portions has a second width, each of the tab portions is coupled to a corresponding one of the plurality of lip portions, and the second width is greater than the first width;
  a plurality of spokes extend outward from a central region of the spacer, at least two of the plurality of spokes are coupled to each tab portion of the plurality of tab portions coupling the at least two of the plurality of spokes to each lip portion of the plurality of lip portions;
 an edge seal secures the straight portions of the first upper filter sheet, the first lower filter sheet, the second upper filter sheet, and the second lower filter sheet, and the plurality of lip portions of the spacer are sandwiched between the straight portion of the second upper filter sheet and the second lower filter sheet.

12. The filtration device of claim 11 wherein the second upper filter sheet and the second lower filter sheet of the second media include a water insoluble or partially water insoluble material or combination of materials that convert or partially convert free fatty acid in the cooking oil to the soap.

13. The filtration device of claim 11 wherein the first upper filter sheet and the first lower filter sheet of the first media include fibrous material.

14. The filtration device of claim 13 wherein the first upper filter sheet and the first lower filter sheet further include at least one of alkaline earth metal silicates, natural silica materials, artificial silica materials, activated carbon, and combinations thereof.

15. The filtration device of claim 14 wherein the alkaline earth metal silicates include at least one of calcium silicates and magnesium silicates.

16. The filtration device of claim 12 wherein the second upper filter sheet and the second lower filter sheet of the second media include fibrous material.

17. The filtration device of claim 16 wherein the second upper filter sheet and the second lower filter sheet further include at least one of alkaline earth metal silicates, natural silica materials, artificial silica materials, activated carbon, and combinations thereof.

18. The filtration device of claim 17 wherein the alkaline earth metal silicates include at least one of calcium silicates and magnesium silicates.

19. The filtration device of claim 11, further comprising:
 a third media including a third upper filter sheet and a third lower filter sheet.

20. The filtration device of claim 19 wherein the third upper filter sheet and the third lower filter sheet of the third media include a water insoluble material or combination of materials that convert or partially convert free fatty acid in the cooking oil to the soap, the third upper filter sheet and the third lower filter sheet each including a main portion and an edge portion, the edge portions including a taper portion and a straight portion, the taper portions coupling the straight portions to the main portions, the taper portions and the straight portions of the third upper filter sheet and the third lower filter sheet are secured together by the edge seal, the taper portions and the straight portions of the third upper filter sheet and the third lower filter sheet are aligned with the straight portions and the taper portions of the first upper filter sheet, the first lower filter sheet, the second upper filter sheet, and the second lower filter sheet.

21. The filtration device of claim 20 wherein the water insoluble or partially water insoluble material or combination of materials that convert or partially convert free fatty acid in the cooking oil to the soap include at least one of $MgCO_3$, $Mg(OH)_2$, $MgO$, $Ca(OH)_2$, $CaCO_3$, and $CaO$.

22. The filtration device of claim 19, wherein the third upper filter sheet and the third lower filter sheet of the third media include a material or combination of materials that remove or at least partially remove the soap from the cooking oil.

23. The filtration device of claim 22 wherein the third upper filter sheet and the third lower filter sheet of the third media include fibrous material.

24. The filtration device of claim 23 wherein the third upper filter sheet and the third lower filter sheet further include at least one of alkaline earth metal silicates, natural silica materials, artificial silica materials, activated carbon, and combinations thereof.

25. The filtration device of claim 24 wherein the alkaline earth metal silicates include at least one of calcium silicates and magnesium silicates.

26. A filtration device for removing contaminants from cooking oil comprising:
an annular hub; and
a plurality of filtration units, the filtration units being configured in a stacked formation, each filtration unit including:
  a first upper filter sheet including a first edge portion, the first edge portion including a first taper portion and a first straight portion;
  a second upper filter sheet including a second edge portion, the second edge portion including a second taper portion and a second straight portion, the second upper filter sheet is adjacent to the first upper filter sheet;
  a spacer adjacent the second upper filter sheet, the second upper filter sheet positioned between the first upper filter sheet and the spacer, the spacer includes:
    a plurality of lip portions positioned at an edge of the spacer, each lip portion being separate and distinct from each other, each lip portion of the plurality of lip portions has a first width;
    a plurality of tab portions, each of the tab portions has a second width, each of the tab portions is coupled to a corresponding one of the plurality of lip portions, and the second width is greater than the first width; and
    a plurality of spokes that extend outward from a central region of the spacer, at least two of the plurality of spokes are coupled to each lip portion of the plurality of lip portions via each tab portion of the plurality of tab portions;
  a third lower filter sheet including a third edge portion, the third edge portion including a third taper portion and a third straight portion, the third lower filter sheet is adjacent the spacer;
  a fourth lower filter sheet including a fourth edge portion, the fourth edge portion including a fourth taper portion and a fourth straight portion, the fourth lower filter sheet adjacent to the third lower filter sheet, the third lower filter sheet being positioned between the fourth lower filter sheet and the spacer; and
  an edge seal receives each respective straight portion of each respective filter sheet, the edge seal covers and seals the respective straight portions of the respective filter sheets, and the plurality of lip portions of the spacer are sandwiched between the respective straight portions of the respective filter sheets.

27. The filtration device of claim 26, wherein each of the respective filter sheets and the spacer includes a respective aperture, the respective apertures of each respective filter sheet and the spacer being aligned with each other.

28. The filtration device of claim 27, wherein the apertures are configured to receive the hub.

29. The filtration device of claim 26, wherein each filtration unit further includes a respective fluid conduit located between a respective second upper filter sheet and a respective first lower filter sheet, each of the respective fluid conduits is aligned with a respective opening of a plurality of openings in the hub allowing the respective fluid conduits to be in fluid communication with the central passageway of the hub.

* * * * *